United States Patent [19]

Danzig et al.

[11] 4,068,050
[45] Jan. 10, 1978

[54] DIFUNCTIONAL TERMINATED MACROMOLECULAR MONOMERS AND CONDENSATION COPOLYMERS PRODUCED THEREFROM

[75] Inventors: Morris J. Danzig, Skokie; Mutong T. Chiang, Palos Heights, both of Ill.

[73] Assignee: CPC International Inc., Englewood Cliffs, N.J.

[21] Appl. No.: 686,776

[22] Filed: May 17, 1976

[51] Int. Cl.² ............................ C08F 8/08; C08F 8/18; C08F 8/34
[52] U.S. Cl. ................................ 526/21; 260/879; 260/886; 526/20; 526/30; 526/41; 526/46; 526/49
[58] Field of Search ................. 260/879, 886; 526/46, 526/30, 41, 49

[56] References Cited

U.S. PATENT DOCUMENTS

| 3,786,116 | 1/1974 | Milkovich et al. | 526/46 |
| 3,862,097 | 1/1975 | Milkovich et al. | 526/46 |
| 3,862,098 | 1/1975 | Milkovich et al. | 526/46 |

Primary Examiner—William F. Hamrock

[57] ABSTRACT

The present invention relates to copolymerizable macromolecular monomers comprised of linear polymers or copolymers having one terminal moiety which contains two functional groups of substantially equivalent reactivity in participating in a condensation copolymerization reaction with difunctional condensible comonomers or prepolymers wherein the macromolecular monomers have substantially the same molecular weight. The present invention also relates to chemically joined, phase separated graft copolymers of the copolymerizable macromolecular monomers with at least two different condensible difunctional comonomers capable of reacting with each other and at least one of which is capable of reacting with the terminal moiety on the macromolecular monomers. Alternatively, the copolymerizable macromolecular monomers may be copolymerized with preformed polymeric segments which are the reaction products of at least two different condensible difunctional comonomers and which have a functional group on each end of the segments capable of reacting with the terminal moiety on the macromolecular monomers.

10 Claims, No Drawings

DIFUNCTIONAL TERMINATED MACROMOLECULAR MONOMERS AND CONDENSATION COPOLYMERS PRODUCED THEREFROM

BACKGROUND OF THE INVENTION a. Statement of the Invention

The present invention relates to difunctional single terminated macromolecular monomers; condensation chemically joined, phase separated graft copolymers comprised of polymeric sidechains and condensation type polymeric backbones; and their preparation.

b. Description of the Prior Art

There have been many attempts by prior art workers to combine the properties of various polymers with other dissimilar polymers by either chemical or mechanical means. Many times these copolymers have been prepared only with difficulty due to the incompatibility of the polymers to be combined.

One way in which this objective has been sought involves the preparation of block or graft copolymers. In this way, two different polymeric segments, normally incompatible with one another, are joined together chemically to give a sort of forced compatibility. In such a copolymer, each polymer segment continues to manifest its independent polymer properties. Thus, the block or graft copolymer in many instances possesses a combination of properties not normally found in a homopolymer or a random copolymer.

One method of combining the properties of condensation-type polymers with styrene, olefin or diene polymers is disclosed in British patent specification No. 1,262,792. This patent describes the preparation of block copolymers by reacting a dicarbanion living polymer prepared by anionic polymerization with a preformed polymeric segment of a condensation-type polymer having a functional group on each end of the polymer capable of reacting with the dicarbanion. Thus, by the method described in the British patent specification No. 1,262,792, polymers having blocks of, for example, polystyrene and polyester are prepared.

Another method for the forced combination of dissimilar polymeric materials is disclosed in U.S. Pat. No. 3,786,116 to Milkovich et al. The patent describes the preparation of graft copolymers by first preparing a monofunctional living polymer by anionic polymerization which is then reacted with a terminating agent to prepare a macromolecular monomer with a copolymerizable end group. The copolymerizable end group is subsequently copolymerized with a backbone-forming comonomer to form the graft copolymer.

The U.S. Pat. No. 3,786,116 discloses the termination of an ethylene oxide capped living polymer with haloalkyl maleic anhydride or haloalkyl maleate esters. It is suggested that the anhydride and ester groups be converted to carboxyl groups and that the resulting dicarboxylic terminated polymers be reacted with glycols or diamines to form polyesters and polyamides having a graft copolymer structure. The reaction of such a dicarboxylic macromolecular monomer with a glycol or diamine as disclosed in the U.S. Pat. No. 3,786,116, however, only results in backbones composed of the corresponding polyester or polyamide. It would be desirable, however, to prepare chemically joined, phase separated graft copolymers having as a polymeric backbone phase the reaction product of at least two condensible comonomers and chemically joined thereto a sidechain phase consisting of a self-reinforcing polymeric entity which provides a thermolabile cross-link to the copolymer. Such copolymers are not disclosed in the U.S. Pat. No. 3,786,116 as described above.

Another copolymerizable end group disclosed in U.S. Pat. No. 3,786,116 is a glycol end group which is prepared by terminating the monofunctional living polymer with epichlorohydrin and subsequently hydrolyzing the resulting epoxide end group to form the glycol or diol end group. It is suggested that this glycol terminated macromolecular monomer can be reacted with a dicarboxylic acid or diisocyanate prepolymer to form a graft copolymer with a polyamide or polyurethane backbone. The glycol or diol end group disclosed in the U.S. Pat. No. 3,786,116, however, made by using the epichlorohydrin end group contains both a primary and a secondary hydroxy group. The primary and secondary hydroxy groups each have different rates of condensation in the condensation reaction with the backbone forming dicarboxylic acids or diisocyanates. Moreover, the glycol or diol terminated macromolecular monomers prepared from epichlorohydrin terminated macromolecular monomers do not form as a symetrical structure as is desired in a condensation-type copolymer.

SUMMARY OF THE INVENTION

The present invention provides difunctional terminated macromolecular monomers having a substantially uniform molecular weight distribution, wherein the difunctional end groups have substantially equivalent reactivity in a condensation copolymerization reaction with at least two condensible comonomers or prepolymers thereof.

One specific embodiment of the present invention comprises macromolecular monomers comprising linear polymers or copolymers having a substantially uniform molecular weight distribution such that the ratio of $\overline{M}w/\overline{M}n$ is less than about 1.1, said macromolecular monomers being further characterized as having no more than one terminal moiety per linear polymer or copolymer chain, said terminal moiety having two similar functional groups of substantially equivalent reactivity in a condensation copolymerization, the macromolecular monomers being represented by the formula:

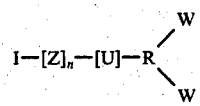

wherein $I$ is the residue of a monofunctional anionic initiator; $Z$ represents a polymerized unit of at least one anionically polymerizable monomer; $U$ is a capping agent which is the reaction product of a compound that is capable of reacting with the carbanion of a living polymer to produce an anion of sufficiently lower basicity than the carbanion of the original living polymer so as not to substantially react with the difuctional groups, W, of a terminating agent, from which the terminal moiety is formed, but sufficiently reactive to react with the halogen on the halogen-containing terminating agent; R is an aliphatic, aryl or aralkyl radical; W is a member selected from the group consisting of $-CO_2H$, $-COCl$, $-CO_2R'$, $-NCO$, $-SO_2Cl$, $-OCOCl$, $-OH$, $-NH_2$ or $-SH$, wherein R' is an alkyl group; and $n$ is a positive integer such that the molecular weight of the macromolecular monomer is in the range from about 2,000 to 50,000, preferably in the range of from about 5,000 to 35,000, and more preferably, in the range of from about 12,000 to about 25,000. Preferably, U is a group selected from the group consisting of an oxyalkylene, 1,1-diphenyl ethylene, 2-butenylene, 2-methyl-2-butenylene, and most preferably, U is an oxyalkylene group such as the reaction product of a living polymer and ethylene oxide. Preferably, R is an alkylene, phenylene, tolylene or bis-phenylene methane group.

Another specific embodiment of the present invention is directed to chemically joined, phase separated graft copolymers comprising copolymers of:

1. from about 1% to about 95% by weight of copolymerizable macromolecular monomers having a substantially uniform molecular weight distribution and having a copolymerizable terminal moiety containing two functional groups of substantially equivalent reactivity in participating in a condensation copolymerization reaction; and
2. from about 99% to about 5% by weight of at least two different copolymerizable condensible comonomers or the prepolymer prepared from the condensation of such comonomers, the copolymerizable condensible comonomers forming the polymeric backbones of said graft copolymers and the copolymerizable macromolecular monomers forming linear polymeric sidechains of said graft copolymers, wherein:
   a. the polymeric backbones of the graft copolymer are comprised of polymerized units of at least two different condensible difunctional comonomers, said condensible comonomers being comprised of at least one comonomer of the formula:

wherein X is selected from the group consisting of —CO$_2$H, —COCl, —CO$_2$R", —NCO, —SO$_2$Cl, or —OCOCl, wherein R" is an alkyl, group; and L is an aliphatic, aryl or aralkyl group; and at least one other comonomer of the formula:

wherein Y is selected from the group consisting of —OH, —NH$_2$, and —SH; and M is an aliphatic, aryl or aralkyl group; and
   b. the linear polymeric sidechains of the graft copolymers are comprised of macromolecular monomers having a substantially uniform molecular weight distribution such that the ratio of $\overline{M}w/\overline{M}n$ is less than about 1.1, said macromolecular monomers being represented by the formula

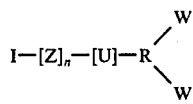

wherein I is the residue of a monofunctional anionic initiator; Z represents a polymerized unit of at least one anionically polymerizable monomer; U is a capping agent which is the reaction product of a compound that is capable of reacting with the carbanion of a living polymer to produce an anion of sufficiently lower basicity than the carbanion of the original living polymer so as not to substantially react with the difunctional groups, W, of a terminating agent, from which the terminal moiety is formed, but sufficiently reactive to react with the halogen on the halogen-containing terminating agent; R is an aliphatic, aryl or aralkyl group; W is a member selected from the group consisting of —CO$_2$H, —COCl, —CO$_2$R', —NCO, —SO$_2$Cl, —OCOCl, —OH, —NH$_2$ and —SH, wherein R' is an alkyl group and n is a positive integer such that the molecular weight of the macromolecular monomers is in the range from about 2,000 to about 50,000; said macromolecular monomers being chemically joined to the backbone copolymer by condensation copolymerization of the W groups on said macromolecular monomers and the two different difunctional comonomers.

The novel graft copolymers of the invention have improved melt rheology and, in some instances, improved dye-receptivity. Depending on the composition of the backbone and sidechains, the graft copolymers of the present invention find uses as thread for the production of cord, rope or cloth, as thin films of high tensile strength, and as coatings for various materials.

DESCRIPTION OF THE PREFERRED EMBODIMENTS

PREPARATION OF THE LIVING POLYMERS

The sidechains of the chemically joined, phase separated graft copolymers, are preferably prepared by the anionic polymerization of a polymerizable monomer or combination of monomers to thereby form living polymers. The living polymers are conveniently prepared by contacting the monomers or combination of monomers with an anionic polymerization initiator in the presence of an inert organic diluent which does not participate in or interfere with a polymerization reaction.

Those monomers susceptible to anionic polymerization are well-known and the present invention contemplates the use of all anionically polymerizable monomers. Preferred anionically polymerizable monomers include vinyl substituted aromatic hydrocarbons containing up to about 12 carbon atoms and conjugated dienes containing 4 to 12 carbon atoms per molecule. Examples of these monomers include styrene, alpha-methylstyrene, vinyl toluene and its isomers, isoprene, butadiene and mixtures thereof.

Many other monomers suitable for the preparation of the sidechains by anionic polymerization are those disclosed in Macromolecular Reviews, Vol. 2, pp. 74-83, Interscience Publishers, Inc. (1967), entitled "Monomers Polymerized by Anionic Initiators" and U.S. Pat. No. 3,786,116, the disclosures of which is incorporated herein by reference.

The initiators for these anionic polymerizations are any alkali metal hydrocarbons and alkoxide salts which produce a mono-functional living polymer, i.e., only one end of the polymer contains a reactive anion. Many suitable anionic initiators are described in U.S. Pat. No. 3,786,116.

The amount of initiator, the solvent, and the temperature conditions for preparing the living polymers are the same as described in U.S. Pat. No. 3,786,116, columns 8 and 9, the disclosure of which is incorporated herein by reference.

The above-described living polymers are susceptible to further reactions including further polymerization. For example, different anionically polymerizable monomers than the original anionically polymerizable monomer may be added to the living polymers to form diblock macromolecular monomers.

These diblock macromolecular monomers are still living polymers. Thus, they are susceptible to further reaction with capping agents as hereinabove defined and thereafter can be terminated with terminating agents as described in more detail below.

The diblock living polymers can be prepared by contacting the first living polymer e.g., a living polymer of a mono-alkenyl substituted aromatic hydrocarbon such as living polystyrene or living poly(alpha-methylstyrene), with another anionically polymerizable monomer, e.g., a conjugated diene such as butadiene or isoprene. In this matter, a living diblock polymer is obtained which can be capped and terminated by the methods in accordance with the practice of the present invention. Utilizing this technique, a living diblock polymer of the following formula can be obtained:

$$A - B\theta$$

wherein A is a polymeric block of a mono-alkenyl substituted aromatic hydrocarbon and B is a polymeric block of a conjugated diene. The preparation of living polymers having a diblock structure are disclosed in U.S. Pat. No. 3,842,146, granted Oct. 15, 1974, the disclosure of which is incorporated herein by reference.

PRODUCTION OF THE MACROMOLECULAR MONOMERS BY TERMINATION OF THE LIVING POLYMERS WITH HALOGEN-CONTAINING DIFUNCTIONAL COMPOUNDS

Because of the basicity of the living polymers described above and because of the nature of the terminating agents to be used in accordance with the practice of the present invention, certain deleterious side reactions will occur, resulting in an impure product if the terminating agent is reacted directly with the living polymers. For example, the carbanion of the living polymers have a tendency to react with functional groups or any active hydrogens of the terminating agents to be used in accordance with the practice of the present invention. In such cases, the resulting macromolecular monomers may have twice the expected molecular weight and/or contain some "dead" or unreactive macromolecular monomers. One means for overcoming the foregoing problem is to render the reactive carbanion of the living polymers less susceptible to reaction with the functional groups or any active hydrogens of the terminating agents. A preferred method to render the living polymers less susceptible to the adverse reaction is to "cap" the highly reactive living polymers with a less reactive reactant.

The "capping agent" as defined herein is a compound that is capable of reacting with the carbanion of the living polymer to produce an anion of sufficiently lower basicity than the carbanion of the original living polymer so that the capped living polymer will not substantially react with the difunctional groups of the terminating agent, but has sufficient basicity to react with the halogen on the halogen-containing terminating agent. Examples of some preferred "capping agents" include the lower alkylene oxides, i.e., one having 8 or fewer carbon atoms such as ethylene and propylene oxide; 1,1-diphenylethylene; and conjugated dienes such as butadiene and isoprene. The "capping" reaction yields a product which still is a living polymer, but yields a purer product when subsequently reacted with a terminating agent containing a functional group or active hydrogen.

The macromolecular monomers of the present invention are prepared by reacting any of the above-described "capped" living polymers with a halogen-containing terminating agent which contains two other functional groups which do not preferentially react with the living polymers, e.g., a halogen-containing diester such as diethyl 2-bromo-2-methyl malonate. The functional groups which do not preferentially react with the "capped" living polymers are characterized as being capable of participating in a condensation copolymerization reaction or as being those which can be converted to functional groups that will participate in a condensation copolymerization reaction.

The terminating agents to be used in accordance with the practice of the present invention are halogen-containing compounds which additionally contain two identical functional groups. The functional groups are those which do not contain moieties which substantially react with the anions of the capped living polymers such as labile hydrogen atoms, halogen groups, etc., but each of which has substantially the same chemical reactivity, or is capable of being converted to functional groups of substantially the same reactivity in a condensation copolymerization reaction.

An illustration of one embodiment of the present invention comprises preparing a living polystyrene and capping the same with ethylene oxide followed by reaction with a halogen-containing alkylene diester, for example, diethyl-2-bromo-2-methyl malonate, to form macromolecular monomers having the structural formula:

$$CH_3CH_2(CH_3)CH-\left[CH_2-CH\underset{\underset{\displaystyle }{\bigcirc}}{}\right]_n-CH_2CH_2O-\underset{\underset{\displaystyle \overset{\|}{C}-OC_2H_5}{\overset{\|}{C}-OC_2H_5}}{\overset{\displaystyle }{C}}-CH_3$$

wherein n is a positive integer such that the molecular weight of the macromolecular monomers is in the range of from about 2,000 to about 50,000.

The macromolecular monomers as illustrated above are useful per se in preparing the condensation copolymers of the present invention. The diester end groups of the macromolecular monomers may be converted into other functional end groups capable of participating in a wide range of other condensation type copolymerization reactions. For example, the diester end groups can be saponified with alkali to form diacid salts. The diacid salts can be treated with thionyl chloride to form the diacid chloride. The diacid chloride can be treated with ammonia to form the diamide, and the diamide can be treated with sodium hypobromite to sequentially form the diisocyanate and the diamine, respectively.

An illustration of another embodiment of the present invention comprises preparing living polymers and then capping the same with ethylene oxide followed by reaction with a mono-halogenated alkylene diacetate such as 2-bromo-tetramethylene-1,4-diacetate. The diacetate can be hydrolyzed to the corresponding diol, i.e., 1,4-tetramethylene diol.

As still another embodiment of the present invention, the living polymer is capped with ethylene oxide and then reacted with bis(4-acetoxy-phenyl)bromomethane. The diacetate moieties can then be hydrolyzed to the corresponding bis-phenol, an aralkyl type compound as hereinabove described.

Termination of the living polymer by any of the above types of terminating agents is accomplished simply by adding the terminating agent to the solution of living polymer at the temperature at which the living polymer is prepared. Reaction is immediate. A slight molar excess of the terminating agent, with respect to the amount of anionic initiator may be used.

The termination may be conducted in any suitable inert solvent. Generally, it is advisable to utilize the same solvent system employed in the preparation of the living polymer. A preferred embodiment of the invention comprises conducting the termination reaction in a hydrocarbon solvent rather than the polar ether type solvents such as tetrahydrofuran. It has been found that the hydrocarbon solvent such as the aromatic hydrocarbons, saturated aliphatic and cycloaliphatic hydrocarbons cause several differences in the reaction conditions and the resulting product. For example, the termination reaction can be conducted at higher temperatures with hydrocarbon solvents as opposed to the other solvents.

The macromolecular monomers can be isolated by known means as illustrated in U.S. Pat. No. 3,786,116, the disclosure of which is incorporated herein by reference.

As noted above, the macromolecular monomers employed in the present invention are characterized by relatively uniform molecular weight, i.e., the distribution of molecular weights of the mixture of macromolecular monomers produced is quite narrow. This is in marked contrast to the typical polymer, where the molecular weight distribution is quite broad. The difference in molecular weight distribution is particularly evident from an analysis of the gel permeation chromatogram of commercial polystyrene (Dow 666u) prepared by free-radical polymerization and polystyrene macromolecular monomers produced by the anionic polymerization followed by capping and termination thereof in accordance with the practice of the present invention. Thus, the macromolecular monomers prepared in accordance with the teachings of the present invention are characterized by having a $\overline{M}w/\overline{M}n$ ratio which is not substantially above about 1.1, where $\overline{M}w$ is the weight average molecular weight of the living polymer, and $\overline{M}n$ is the number average molecular weight of the living polymer, as determined by ordinary analytical techniques such as gel permeation chromatography (GPC).

The macromolecular monomers of the present invention possess the aforementioned narrow molecular weight distribution and purity due to the method of their preparation, described hereinabove. Thus, it is important that the sequence of steps in preparing the macromolecular monomers be adhered to in order to produce the optimum results in beneficial properties in the graft copolymers.

CONDENSATION COPOLYMERIZATION

In accordance with the other specific embodiment of the present invention, the above-described copolymerizable macromolecular monomers having a terminal moiety comprising two functional groups of substantial equivalent reactivity in a condensation copolymerization can be reacted with a mixture of at least two different condensible difunctional comonomers. The result is a graft copolymer having a backbone comprised of polymerized units of the end group on the copolymerized macromolecular monomers and the difunctional comonomers and pendant polymeric sidechains comprised of the copolymerized macromolecular monomers. Alternatively, the copolymerizable macromolecular monomers can be reacted with preformed polymeric segments which are the reaction products of at least two different condensible difunctional comonomers having a functional group on each end of the segment capable of reacting with the functional end groups on the copolymerizable macromolecular monomers. By this method, polymeric segments of a pre-determined size can be used and the distribution of the sidechains along the backbone can be controlled.

The term "condensation polymerization" as used in the specification and claims means a step reaction. Thus, while a condensation polymerization usually results in the elimination of a small molecule such as water or hydrochloric acid, the term also describes the reaction of a diisocyanate and a glycol in which no small molecule is liberated during the polymerization. Likewise, the term "condensible comonomers" is used in the specification and claims to mean any comonomer that will participate in the condensation polymerization as described above.

The different condensible difunctional comonomers suitable for use in the present invention are well-known in the art. One of the difunctional comonomers is preferably a compound of the formula $$X - L - X \qquad (I)$$

wherein X represents a —CO$_2$H, —COCl, —CO$_2$R'',

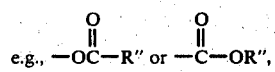

e.g., —OC—R'' or —C—OR'',

—NCO, —SO$_2$Cl or —OCOCl group, wherein R'' is an alkyl group and L represents an aliphatic, aryl or aralkyl group. Preferably, L is an alkylene having 2 to 12 carbon atoms, phenylene, substituted phenylene having 7 to 12 carbon atoms, bis-phenylene, or bis phenylene-methane such as bis-phenol A.

The other difunctional comonomer is preferably a compound of the formula $$Y - M - Y \qquad (II)$$

wherein Y represents —OH, —NH$_2$, or —SH groups and M represents an aliphatic, aryl or aralkyl group. Preferably, M is an alkylene having 2 to 12 carbon atoms, phenylene, substituted phenylene having 7 to 12 carbon atoms, bis-phenylene or bis-phenylene-methane such as bis-phenol A.

The above-described condensible difunctional comonomers of formulae I and II (and similar comonomers) are capable of reaction with each other to form condensation-type polymers. By terminating the macromolecular monomers with the appropriate terminal moiety, the copolymerizable macromolecular monomers can also participate in the condensation copolymerization reaction along with the difunctional comonomers of formulae I and/or II. In this way, a graft copolymer with a condensation type polymeric backbone and addition type polymeric sidechains can be prepared.

A graft copolymer having a polyester backbone and polystyrene sidechains can be prepared by reacting a diacid or diacid halide such as malonic acid or malonyl dichloride, a glycol such as ethylene or propylene glycol, with diacid, diacid halide or diol terminated polystyrene macromolecular monomers. Similarly, a graft copolymer having a polyamide backbone and polybutadiene sidechains can be prepared by reacting a diamine such as hexamethylene diamine, a diacid or diacid halide such as adipoyl dichloride, and diacid, diacid halide or diamine terminated polybutadiene macromolecular monomers. Likewise, a graft copolymer with a polyurethane backbone and polyisoprene sidechains can be prepared by reacting a diisocyanate such as ethylene or tolylene diisocyanate, a glycol such as ethylene glycol, and diisocyano or diol terminated polyisoprene macromolecular monomers.

By appropriate choice of the different difunctional condensible comonomers and the terminal moiety on the macromolecular monomers, graft copolymers having polyurea, polyacetal, unsaturated polyester and polycarbonate backbones can also be prepared.

The graft copolymers of the present invention can also be formed by first preparing polymeric segments by reacting the appropriate different condensible difunctional comonomers to form the type of backbone wanted. e.g., a diamine and a diacid chloride to form a polyamide segment. In preparing this preformed polymeric segment, a small excess of one of the condensible comonomers that is reactive with the terminal moiety on the macromolecular monomers is added. Thus, polymeric segments having a function end group on each end of the segment capable of reacting with the terminal moiety on the copolymerizable macromolecular monomers are prepared. These preformed polymeric segments are then reacted with suitably terminated macromolecular monomers to prepare graft copolymers. For example, adipoyl dichloride and a small molar excess of hexamethylene diamine can be reacted to form polyamide segments having an amine group on each end. These polyamide segments are then reacted with diacid chloride terminated polystyrene macromolecular monomers to form chemically joined, phase separated graft copolymers having a polyamide backbone and polystyrene sidechains.

The condensation copolymers can be prepared by a variety of condensation polymerization techniques. For example, the condensation polymerization can be carried out in solution. The solvent used must be inert to both the condensible difunctional comonomers and the terminal moiety on the copolymerizable macromolecular monomers, e.g., benzene, toluene, cyclohexane, etc. Thus, for example, a graft copolymer having a polyester backbone can be prepared by racting adipoyl dichloride, hexamethylene diamine and diacid chloride or diamine terminated macromolecular monomers in a suitable inert solvent. Graft copolymers having polyurethane, polyamide, polyurea and polycarbonate backbones can also be prepared in accordance with the practice of the present invention.

The polymerization of the two different condensible comonomers and the terminated macromolecular monomers can also be carried out by the melt technique which is well-known in the art. In one form of the melt technique, the reactants are heated in an autoclave under vacuum. This technique can be used to prepare, for example, polyester or polyamide backbone containing graft copolymers. For instance, dimethyl terephthalate, ethylene glycol and diethyl-2-methyl malonate terminated macromolecular monomers can be reacted under these conditions to prepare a graft copolymer having a poly(ethylene terephthalate) backbone. Also, using this technique, hexamethylene diamine, adipoyl dichloride and a diacid chloride or diamine terminated macromolecular monomers can be used to prepare a graft copolymer having a poly (hexamethylene adipamide) backbone. This technique is a well-known in the art, see, F. W. Billmeyer, Jr., Textbook of Polymeric Science (2d. Ed.) Chapter 15, pp. 43–67, which is incorporated herein be reference.

An interfacial condensation technique can also be used to form the condensation copolymer of the invention. By this method, one of the condensible difunctional comonomers, usually a diol or diamine such as ethylene glycol or hexamethylene diamine is dissolved in aqueous liquid. The aqueous liquid usually contains an acid acceptor or buffer. The second condensible difunctional comonomer, usually a diacid halide such as adipoyl dichloride, and a diacid chloride, terminated macromolecular monomer are dissolved in an organic liquid. The organic and aqueous phases are then contacted and a polymer forms at the interface of the two phases. By this technique, a very high molecular weight copolymer can be formed. The copolymer formed can be pulled off as a continuous film or filament. By judicious choice of the terminal moiety of the copolymerizable macromolecular monomers, this technique can be applied to form graft copolymers having polyamide, polyurethane, polyurea and polyester backbones.

The temperature at which the copolymerization reaction is conducted varies greatly and it depends on the structure of the different condensible difunctional comonomers and the terminal moiety of the copolymerizable macromolecular monomers. For example, the reaction of a diacid chloride such as adipoyl dichloride, a diamine such as hexamethylene diamine and diacid chloride terminated macromolecular monomers will occur at room temperature. The ester interchange reaction of a diester such as dimethyl terephthalate, a glycol such as ethylene glycol and a diester (e.g., diethyl-2-methyl malonate) terminated macromolecular monomer, by contrast, requires the application of heat, i.e., the reaction is carried out from about 200° to 300° C.

Solvents that can be used in the present invention also vary depending on the technique used to perform the condensation copolymerization, the structure of the different condensible difunctional comonomers and the terminal moiety on the macromolecular monomers. In some instances, using the melt technique, no solvent is required. In other instances using the melt technique, one of the condensible comonomers can be used as the solvent.

If the interfacial polymerization technique is used, the organic phase can be any suitable solvent that is immiscible with water, dissolves the copolymerizable macromolecular monomers and at least one of the condensible difunctional comonomers, and does not react with a terminal moiety on the copolymerizable macromolecular monomers or the condensible difunctional comonomers. Suitable solvents for the interfacial condensation technique include benzene, toluene, cyclohexane, etc.

An illustrative example of the present invention includes combining the advantageous properties of polystyrene with the advantageous properties of a polyester, although these polymers are normally incompatible with one another, and a mixture of these polymers is not generally useful per se. For example, the polyesters themselves usually exhibit some resistance to dyeing.

By polymerizing diol, diester, diacid or diacid chloride terminated macromolecular monomers with the appropriate condensible difunctional comonomers to form a graft copolymer having polystyrene sidechains and a polyester backbone, the dye-receptivity of the polyester is improved. Also, the incorporation of the polystyrene sidechains into the crystalline type polyester backbones will impart an improved melt rheology for molding the polyester.

The melt rheology of crystalline or high Tg condensation copolymers can be improved by incorporating the copolymerizable macromolecular monomer sidechains into these polymers, e.g., the crystalline polyacetal, polyamide and polycarbonate condensation copolymers. This is preferably accomplished by employing copolymerizable macromolecular monomers containing a conjugated diene or hydrogenated conjugated dienes, e.g., hydrogenated polyisoprene macromolecular monomers. Moreover, the dye-receptivity of some polyamides and polyacetals can also be improved by incorporating macromolecular monomer sidechains into such condensation copolymers.

The graft copolymers of the present invention may be used as alloying agents to join one or more incompatible polymers. The graft copolymers of the present invention may also be used in the preparation of a variety of polyblends — thus combining the properties of the graft copolymers with other polymers such as polymers of acetals, acrylics, acrylonitriles, alkyds, amino resins, butyl rubbers, epoxides, ethylene-propylene elastomers, flourocarbons, phenolics, amides, butadienes, SBR rubbers, butenes, carbonates esters, ethylene, propylene, imides, styrene, sulfone, urethane, vinyl acetate, vinyl alcohol, vinyl chloride, etc.

When using the graft copolymers of the present invention as an alloying agent or in the preparation of polyblends, the graft copolymers are admixed with one or more polymers as described above by techniques known in the art, dry grinding, heat melt techniques, etc. Preferably, the graft copolymer will be added in an amount sufficient to provide from about 1 to about 50 parts by weight of the graft copolymer in the polyblend or alloyed composition and the composition will contain from about 99 to about 50 parts by weight of at least one other polymer as above described.

The graft copolymers of the present invention may also be used in combination with other materials such as glass, fiber glass, steel or carbon black.

The invention is illustrated further by the following examples which, however, are not to be taken as limiting in any respect. In each case, all materials should be pure and care should be taken (unless otherwise indicated) to keep the reacted mixtures dry and free of contaminants. All parts and percentages, unless stated to be otherwise, are by weight.

EXAMPLE 1

Preparation of a Polystyrene Terminated with a Diester Functional Group

A stainless steel reactor was charges with 2.7 l. of ACS grade benzene (thiophene-free) which had been predried by Linde molecular sieves and calcium hydride. The reactor was heated to 40° C and 0.1 ml. of diphenylethylene was added by means of a hypodermic syringe. Then 0.5 ml. of a 12.1% solution of secondary butyl lithium in hexane was added portionwise until retention of the permanent pale yellow color, at which point a total of 42.3 ml. of secondary butyl lithium solution was added, followed by the addition of 819 g. of purified styrene over a period of 15 minutes. The reactor temperature was maintained at 40° C. The living polystyrene was capped by the addition of ethylene oxide and allowed to stand overnight at 20° C. The mixture was heated to 40° C before 19.5 ml. of diethyl 2-bromo-2-methyl malonate was added. After 1 hour at 38°–42° C, the mixture was heated to 50° C and held at that temperature for an additional hour before it was cooled. The resulting copolymerizable macromolecular monomers were precipitated by the addition of the polystyrene-benzene solution to methanol with vigorous stirring. The solid was collected, dissolved in benzene and reprecipitated a total of three times to remove unreacted ester. It was then dried for 16 hours at 60° C under vacuum. The molecular weight of the macromolecular monomers as determined by gel permeation chromatography was 16,000 with approximately 13% of a second component having approximately 30,000 molecular weight. The ratio of $\overline{M}w/\overline{M}n$ for the macromolecular monomers as prepared above was determined to be 1.133. In other words, the ratio of $\overline{M}w/\overline{M}n$ was not substantially above about 1.1. The macromolecular monomers produced by this procedure have a structural formula represented as follows:

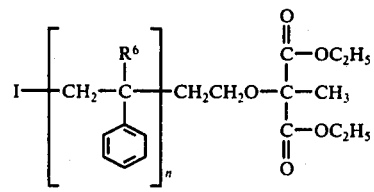

wherein I is a secondary butyl group and $R^6$ is a hydrogen.

The functionality of the diester terminated macromolecular monomers prepared above were determined by calculating their saponification equivalent using the following procedure: 25 ml. of a 0.5 N solution of sodium hydroxide in methanol was added to a solution of 40 g. of the macromolecular monomers in 320 ml. of a 15:1 solution of benzene and methanol. The solution was refluxed for 2 hours. It was then cooled and titrated with a solution of 0.5 N hydrochloric acid in 1:1 ethylene glycol and isopropanol using a recording titrator. The amount of ester was calculated from the amount of sodium hydroxide depleted by the saponification reaction. The results indicated that the macromolecular monomers contained 81% of the theoretical amount of ester groups.

EXAMPLE 2

Preparation of a Polystyrene Terminated with a Diester Functional Group

A stainless steel reactor was charged with 2.6 l. of dry purified benzene. The reactor was heated to 40° C and 0.1 ml. of diphenylethylene was added by means of a hypodermic syringe. Then a few drops of a solution of secondary butyl lithium in hexane was added until a pale yellow color persisted. Subsequently, 35 ml. of a 13.65% solution of secondary butyl lithium in hexane was charged to the reactor. This was followed by the addition of 763 g. of purified styrene over a period of 15 minutes. The reactor temperature was maintained at 40° C. The living polystyrene was capped by the additin of gaseous ethylene oxide for 15 minutes from a cylinder. Eleven hundred grams of this solution was then added slowly with stirring to a solution of 20 ml. of diethyl 2-bromo-2-methyl malonate in 200 g. of purified benzene. The temperature was held at 38°-40° C. The addition required 1 hour. The material was left at room temperature over the weekend. The copolymerizable macromolecular monomers were precipitated by the addition of the polystyrene-benzene solution to methanol with vigorous stirring. The solid was collected, dissolved in benzene and reprecipitated two more times to remove unreacted ester. The molecular weight of the macromolecular monomers as determined by gel permeation chromatography was 17,000 with 5-6% of a second component having a molecular weight of approximately 34,000 i.e., the ratio of $\overline{M}w/\overline{M}n$ was less than about 1.1. The saponification equivalent was determined as described above in Example 1 and the results indicated that the macromolecular monomers produced by the procedure described above contained substantially the theoretical amount of the ester groups. The macromolecular monomers produced have the following structural formula:

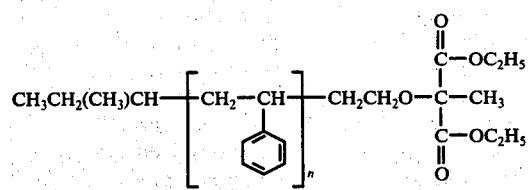

EXAMPLE 3

Substantially the same procedure as described above in Example 2 was repeated using diethyl chloromalonate in place of diethyl 2-bromo-2-methyl malonate. The molecular weight of the macromolecular monomers produced was 16,600 and the ratio of $\overline{M}w/\overline{M}n$ was less than about 1.1. The saponification equivalent was determined as described in Example 1 and the results indicated that the macromolecular monomers contained 71% of the theoretical amount of ester groups. The macromolecular monomers produced have the following structural formula:

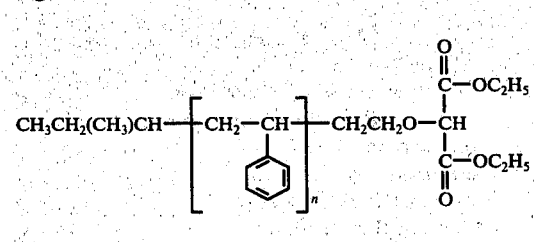

EXAMPLE 4

Substantially the same procedure as described above in Example 2 was again repeated using dimethyl bromosuccinate in place of diethyl 2-bromo-2-methyl malonate. The molecular weight of the macromolecular monomers produced was 17,000 with approximately 6% of the material showing an approximate molecular weight of 34,000, i.e., the ratio of $\overline{M}w/\overline{M}n$ was less than about 1.1. The saponification equivalent was determined as described above in Example 1 and the results indicated that the macromolecular monomers contained 65% of the theoretical amount of ester groups. The macromolecular monomers produced have the following structural formula:

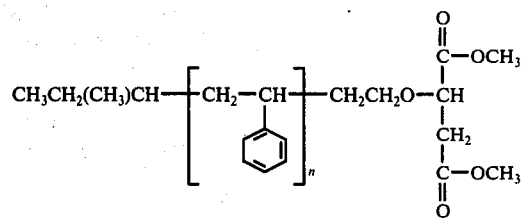

EXAMPLE 5

Substantially the same procedure as descdribed above in Example 2 was repeated using diethyl 2-(5-bromoamyl)-malonate in place of diethyl-2-bromo-2-methyl malonate. The macromolecular monomers obtained had a molecular weight of 14,500 with approximately 1% of the natural showing a molecular weight of approximately 29,000, i.e., the ratio of $\overline{M}w/\overline{M}n$ was less than about 1.1. This material was subjected to the saponification test as described above in Example 1. Substantially no functionality was detected for this particular composition. It is believed that this specific saponification test was not amenable to the particular ester end groups on the macromolecular monomers. The macromolecular monomers produced have the following structural formula:

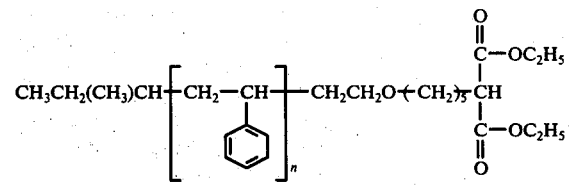

EXAMPLE 6

Preparation of a Polystyrene Terminated with a Diester Functional Group

A stainless steel reactor was charged with 2.7 l. of ACS grade benzene thiophene-free) which had been predried by Linde molecular sieves and calcium hydride. The reactor was heated to 40° C and 0.06 ml. of diphenylethylene was added by means of a hypodermic syringe. The reactor was sterilized by the dropwise addition of a solution of secondary butyl lithium in hexane until appearance of yellow color. Then 42 ml. of a 13.65% solution of secondary butyl lithium in hexane was added to the reactor. This was followed by the addition of 810 g. of purified styrene over a 15-minute period while the reactor was held at 40° C. After an additional 20 minutes, the living polystyrene was capped by the addition of gaseous ethylene oxide from a cylinder over an 8-minute period. After an additional 90 minutes, the solution was cooled to 10° C and added slowly to 40 ml. of diethyl 2-methyl-2-bromo malonate in 300 ml. of benzene. The addition required 160 minutes. Gel permeation chromatography of the solution indicated that 94% of the copolymerizable macromolecular monomers had a molecular weight of 14,500 while 6% of macromolecular monomers had a molecular weight of approximately 29,000, i.e., the ratio of $\overline{M}w/\overline{M}n$ was less than about 1.1. The macromolecular monomers were isolated by pouring the solution dropwise into an excess of methanol with vigorous stirring. The precipitate was collected and reprecipitated twice from benzene. The solid was dried in a vacuum over at 65° C. The saponification equivalent was determined as described above in Example 1 and the results indicated that the macromolecular monomers produced by the procedure described above contained essentially the theoretical amount of ester groups. The macromolecular monomers produced have the following structural formula:

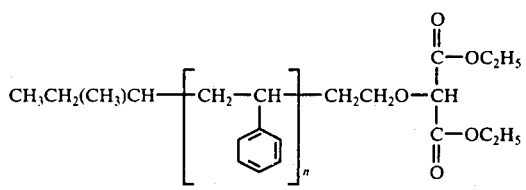

EXAMPLE 7

Preparation of a Graft Copolymer from Polystyrene Macromolecular Monomers Capped with Ethylene Oxide and Terminated with Diethyl-2-methylmalonate, Ethylene Glycol, and Dimethyl Terephthalate

Three g. of the diethyl-2-methylmalonate terminated polystyrene prepared in Example 2, 11 g. of ethylene glycol, 12 g. of dimethyl terephthalate, 0.025 g. of calcium acetate and 0.006 g. of antimony trioxide were placed in a test tube. The mixture was heated in an oil bath at 200° C for 1 hour while a slow stream of nitrogen was passed through the mixture. The tube was heated in an autoclave at 200° C for 2 hours and then for an additional 2 hours at 280° C under vacuum (10mm Hg). The mixture was left overnight at room temperature. 12.5 g. of hard polymer was collected. A 10.04 g. sample of the powder was extracted for 16 hours with boiling benzene in a Soxhlet extractor. 2.48 g. of the product was soluble in benzene. The benzene-soluble fraction was analyzed by gel permeation chromatography and it was found that 1.21 g. or 49% of the benzene-soluble product was unreacted macromolecular monomers having a molecular weight of about 15,000. Fifty-one percent or 1.27 g. of the benzene-soluble fraction was a graft copolymer with a molecular weight of about 30,000.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. Copolymerizable macromolecular monomers comprising linear polymers or copolymers having a substantially uniform molecular weight distribution such that the ratio of $\overline{M}w/\overline{M}n$ is less than about 1.1, said macromolecular monomers being further characterized as having no more than one terminal moiety per linear polymer or copolymer chain, said terminal moiety having two identical functional groups of substantially equivalent reactivity in a condensation copolymerization, the macromolecular monomers being represented by the formula:

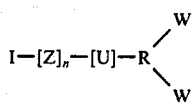

wherein I is the residue of an alkali metal alkyl or alkali metal alkoxide monofunctional anionic initiator; Z represents a polymerized unit of at least one anionically polymerizable monomer; U is a capping agent which is the reaction product of a compound that is capable of reacting with the carbanion of a living polymer to produce another anion of sufficiently lower basicity than the carbanion of the original living polymer so as not to substantially react with the difunctional groups, W, of a halogen-containing terminating agent, from which the terminal moiety is formed, but sufficiently reactive to react with the halogen of the terminating agent; R is an aliphatic, aryl or aralkyl group; W is a member selected from the group consisting of $CO_2H$, $COCl$, $CO_2R'$, $NCO$, $SO_2Cl$, $OCOCl$, $OH$, $NH_2$ or $SH$, wherein R' is an alkyl group; and n is a positive integer such that the molecular weight of the macromolecular monomers is in the range of from about 2,000 to about 50,000.

2. The copolymerizable macromolecular monomers of claim 1, wherein I is a lower alkyl group; Z is a repeating unit of a member selected from the group consisting of styrene, alpha-methylstyrene, isoprene, butadiene and mixtures thereof; n is a positive integer such that the molecular weight of the macromolecular monomer is in the range of from 2,000 to about 50,000; U is selected from the group consisting of oxyalkylene, b 1,1-diphenyl ethylene, 2-butenylene and 2-methyl-2-butenylene; and

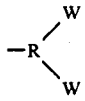

is a terminal moiety selected from the group consisting of
—$C(CH_3)$ $(CO_2C_2H_5)_2$,
—$CH(CO_2C_2H_5)_2$,
—$CH(CO_2C_2H_5)CH_2CO_2C_2H_5$, and
—$(CH_2)_5CH(CO_2C_2H_5)_2$.

3. The copolymerizable macromolecular monomers of claim 1, wherein R is selected from the group consisting of alkylene having 1 to 12 carbon atoms, phenylene, tolylene and bis-phenylene methane groups.

4. The copolymerizable macromolecular monomers of claim 2 having the formula

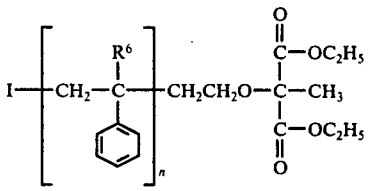

wherein I is a lower alkyl group, $R^6$ is hydrogen or a lower alkyl group, and n is a positive integer such that the molecular weight of the macromolecular monomers is in the range of from about 2,000 to about 50,000.

5. The copolymerizable macromolecular monomers of claim 2 having the formula

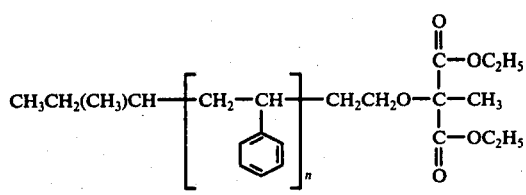

wherein *n* is a positive integer such that the molecular weight of the macromolecular monomers is in the range of from about 2,000 to about 50,000.

6. The copolymerizable macromolecular monomers of claim 2 having the formula

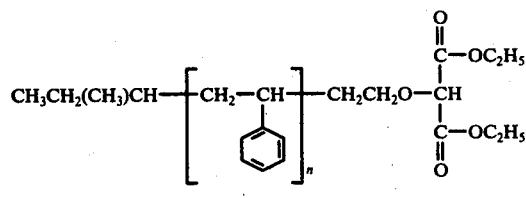

wherein *n* is a positive integer such that the molecular weight of the macromolecular monomers is in the range of from about 2,000 to about 50,000.

7. The copolymerizable macromolecular monomers of claim 2 having the formula

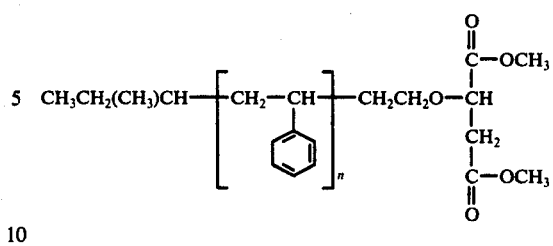

wherein *n* is a positive integer such that the molecular weight of the macromolecular monomers is in the range of from about 2,000 to about 50,000.

8. The macromolecular monomers of claim 1, wherein *n* is a positive integer such that the molecular weight of the macromolecular monomers is in the range of from about 5,000 to about 35,000.

9. The macromolecular monomers of claim 1, wherein *n* is a positive integer such that the molecular weight of the macromolecular monomers is in the range of from about 12,000 to about 25,000.

10. Copolymerizable macromolecular monomers having the structural formula:

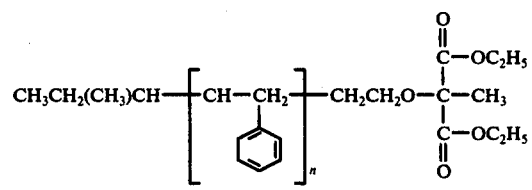

wherein *n* is a positive integer such that the molecular weight of the macromolecular monomers is about 15,000.

* * * * *